(12) United States Patent
Ikeda

(10) Patent No.: US 8,040,767 B2
(45) Date of Patent: Oct. 18, 2011

(54) OPTICAL DISC DRIVE

(75) Inventor: Eiji Ikeda, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 10 days.

(21) Appl. No.: 12/748,589

(22) Filed: Mar. 29, 2010

(65) Prior Publication Data

US 2010/0254235 A1 Oct. 7, 2010

(30) Foreign Application Priority Data

Apr. 6, 2009 (JP) .................................. 2009-091891

(51) Int. Cl.
*G11B 20/10* (2006.01)
(52) U.S. Cl. ..................................................... 369/47.15
(58) Field of Classification Search ................. 369/47.1, 369/47.11, 47.15, 47.3
See application file for complete search history.

(56) References Cited

U.S. PATENT DOCUMENTS
6,560,662 B1 5/2003 Sakai

FOREIGN PATENT DOCUMENTS
| JP | 2001-014227 | 1/2001 |
| JP | 2001-357619 | 12/2001 |
| JP | 2006-119886 | 5/2006 |

*Primary Examiner* — Wayne Young
*Assistant Examiner* — Brenda Bernardi
(74) *Attorney, Agent, or Firm* — Antonelli, Terry, Stout & Kraus, LLP.

(57) ABSTRACT

It is provided an optical disc drive for playing data from a loaded optical disc medium. A controller of the optical disc drive judges whether the processing command has been received and whether a reset command has been received, measures a time between a reception of the processing command and a reception of the reset command in a case where the processing of the received processing command does not end until the reception of the processing command, determines a processing time limit shorter than the measured time, and in a case where the processing of the received processing command does not end until the decided processing time limit has elapsed after the reception of the processing command, stops the processing of the processing command and notifies that the processing of the processing command has been stopped to the host device.

6 Claims, 3 Drawing Sheets

US 8,040,767 B2

OPTICAL DISC DRIVE

CLAIM OF PRIORITY

The present application claims priority from Japanese patent application JP 2009-91891 filed on Apr. 6, 2009, the content of which are hereby incorporated by reference into this application.

BACKGROUND OF THE INVENTION

This invention relates to an optical disc drive, and more particularly to, an optical disc drive that can prevent a reset operation due to a time-out of a host computer.

Up to now, the optical disc drive has a time limit of a command processing set in order to prevent the reset operation due to the time-out of the host computer, and if the time limit of the command processing is exceeded, reports an error to a host computer (see, for example, JP 2001-357619 A). A fixed value is set for the time limit of the command processing based on a minimum value of a plurality of conceivable time-out periods.

Further, in a disk array device, in a case where a plurality of host devices having different time-out periods are coupled simultaneously, it is proposed that a response guarantee time be set for each of the host devices (see, for example, JP 2006-119886 A).

Further, in a disk processing apparatus, it is proposed that the time-out period of a host computer 8-n stored in a time-out period storage section be updated based on a period of time that passes since data transfer is started until a SCSI bus reset is received (see, for example, JP 2001-14227 A).

SUMMARY OF THE INVENTION

If an internal error occurs upon execution of a read/write command, the optical disc drive attempts to recover from the internal error by a retry processing for again executing a processing of the command. If a large value is set for a command processing time limit, it is possible to increase the time available for the retry processing by the same amount, and it becomes highly possible to recover from the internal error. However, it becomes highly probable that the host computer may transmit a reset command to the optical disc drive. If the host computer transmits the reset command to the optical disc drive, the optical disc drive is decoupled from the host computer, and the optical disc drive may be unavailable unless the host computer and the optical disc drive are restarted.

Further, as described in JP 2006-119886 A, the coupled host devices and the time-out periods of the respective host devices are known in the above-mentioned disk array device. Therefore, the time-out periods of the respective host devices can be set in advance in the disk array device from a management terminal. However, it is unknown which host computer the optical disc drive that is the subject of this invention is coupled to In other words, the time-out period differs depending upon an operating system (OS), but the OS running on the host computer that has access to the optical disc drive is unknown, and it is unknown when the host computer judges a time-out. Further, the time-out period differs depending upon an application program running on the host computer as well, and hence the time-out period may be different each time access is made even if the optical disc drive is coupled to the same host computer.

Further, as described in JP 2001-14227 A, in the above-mentioned disk processing apparatus, if a time-out occurs in a data transfer processing, the disk processing apparatus shifts to a bus free phase to thereby release a SCSI bus. However, shifting to the bus free phase abruptly during communications is a protocol anomaly, and it is conceivable that the host device resets the disk processing apparatus. The disk processing apparatus is restarted upon the reset, which may increase a processing time. Further, the protocol anomaly may cause the host device to decouple the disk processing apparatus from the bus, and after that, the disk processing apparatus may become inaccessible to the host device.

Therefore, it is desired that an appropriate time limit of the command processing be dynamically set according to the host computer (OS or application program) coupled to the optical disc drive.

A representative aspect of this invention is as follows. That is, there is provided an optical disc drive for playing data from a loaded optical disc medium according to a processing command issued from a host device, comprising an optical head, a controller and an interface. The controller judges whether the processing command issued from the host device has been received and whether a reset command issued from the host device has been received, the reset command being transmitted in a case where the host device judges a time-out of a processing of the processing command, measures a time between a reception of the processing command and a reception of the reset command in a case where the processing of the received processing command does not end until the reception of the processing command, determines a processing time limit shorter than the measured time, and in a case where the processing of the received processing command does not end until the decided processing time limit has elapsed after the reception of the processing command, stops the processing of the processing command and notifies that the processing of the processing command has been stopped to the host device.

According to an exemplary embodiment of this invention, an appropriate time limit of a command processing can be set according to a host device coupled to the optical disc drive.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Figure 1:
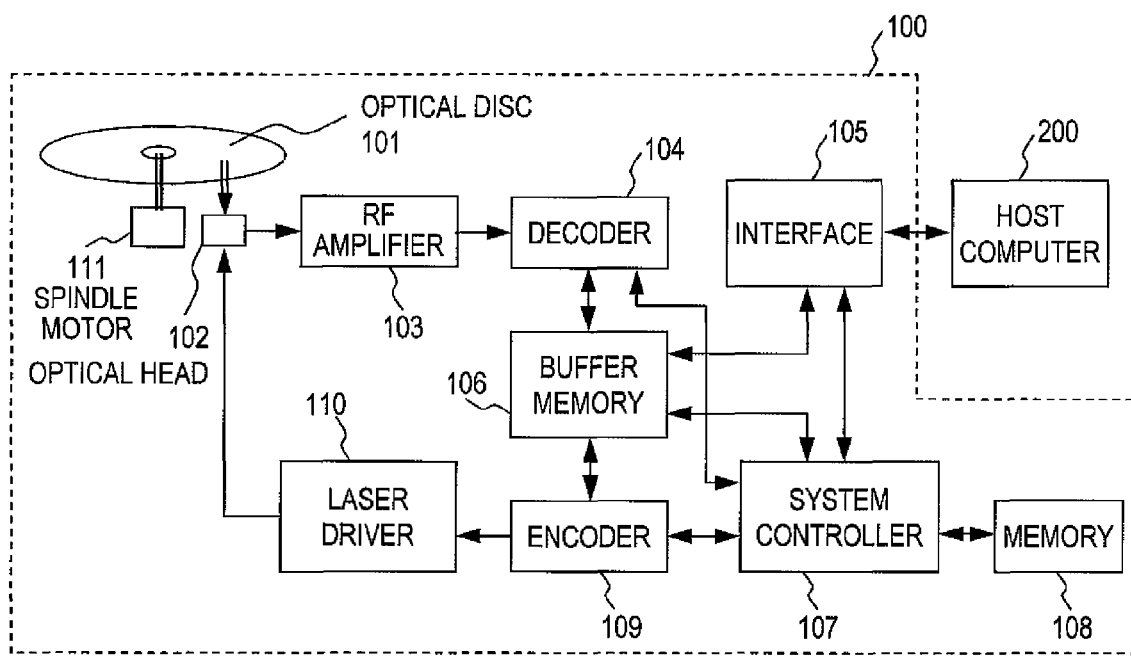
FIG. 1 is a block diagram illustrating a configuration of an optical disc drive according to an embodiment of this invention.

FIG. 1 is a block diagram illustrating a configuration of an optical disc drive 100 according to an embodiment of this invention.

The optical disc drive 100 according to this embodiment includes an optical head 102, an RF amplifier 103, a decoder 104, an interface 105, a buffer memory 106, a system controller 107, a memory 108, an encoder 109, a laser driver 110, and a spindle motor 111.

The optical disc drive 100 is connected to a host computer 200 via the interface 105. The optical disc drive 100 records data input from the host computer 200 onto a writable optical disc 101 (for example, CD-R), and outputs the data played from the optical disc 101 to the host computer 200. The spindle motor 111 drives the optical disc 101 to rotate.

When the data is played from the optical disc 101, the optical head 102 irradiates the optical disc 101 with weak laser light, plays the data recorded on the optical disc 101 based on reflected light of the laser light, and outputs an RF signal corresponding to the reflected light. Further, when the data is recorded onto the optical disc 101, the optical head 102 irradiates the optical disc 101 with laser light stronger than the laser light applied in the playing data. The optical disc 101 has data recorded thereon when a recording pit is formed on a recording layer by a phase change due to heat generated in a portion irradiated with the laser light while changing a reflectance of the recording layer.

The RF amplifier 103 amplifies the RF signal output from the optical head 102, and outputs the amplified RF signal as digital data. The decoder 104 decodes the digital data output from the RF amplifier 103 according to a format determined for each kinds of optical disc, and temporarily stores the decoded data into the buffer memory 106 after performing error detection and error correction.

The interface 105 controls transmission/reception of the data to/from the host computer 200 coupled to the optical disc drive 100. The buffer memory 106 temporarily stores the data that is input from the host computer 200 via the interface 105 and is to be recorded onto the optical disc 101.

The encoder 109 encodes the data input from the host computer 200 and temporarily stored in the buffer memory 106 according to the format determined for each kinds of optical disc. The laser driver 110 outputs a drive signal for driving a laser light source of the optical head 102.

The system controller 107 is a microprocessor for controlling an operation of the optical disc drive 100, and controls operations of the decoder 104, the encoder 109, and the interface 105. Further, the system controller 107 controls reading of the data temporarily stored in the buffer memory 106 and writing of the data into the buffer memory 106. Further, the system controller 107 analyzes a command received from the host computer 200, performs a processing according to the analyzed command, and executes a processing for setting a command processing time limit, which is described later with reference to FIG. 2.

The memory 108 stores the data necessary for the system controller 107 to execute a processing and the data generated by the processing (for example, a measured time-out period and a set command processing time limit). The memory 108 includes a nonvolatile memory area in at least one portion of its memory area. A processing time limit described later may be stored in the nonvolatile memory area. By storing the set command processing time limit in the nonvolatile memory area, the set command processing time limit is retained even if power of the optical disc drive 100 is shut off, and it is possible to use the already-set command processing time limit even when the power is turned on again.

It should be noted that in a case where the processing time limit is stored in a volatile memory area, the command processing time limit is set each time the power of the optical disc drive 100 is turned on, thereby making it possible to an appropriate command processing time limit.

Figure 2:
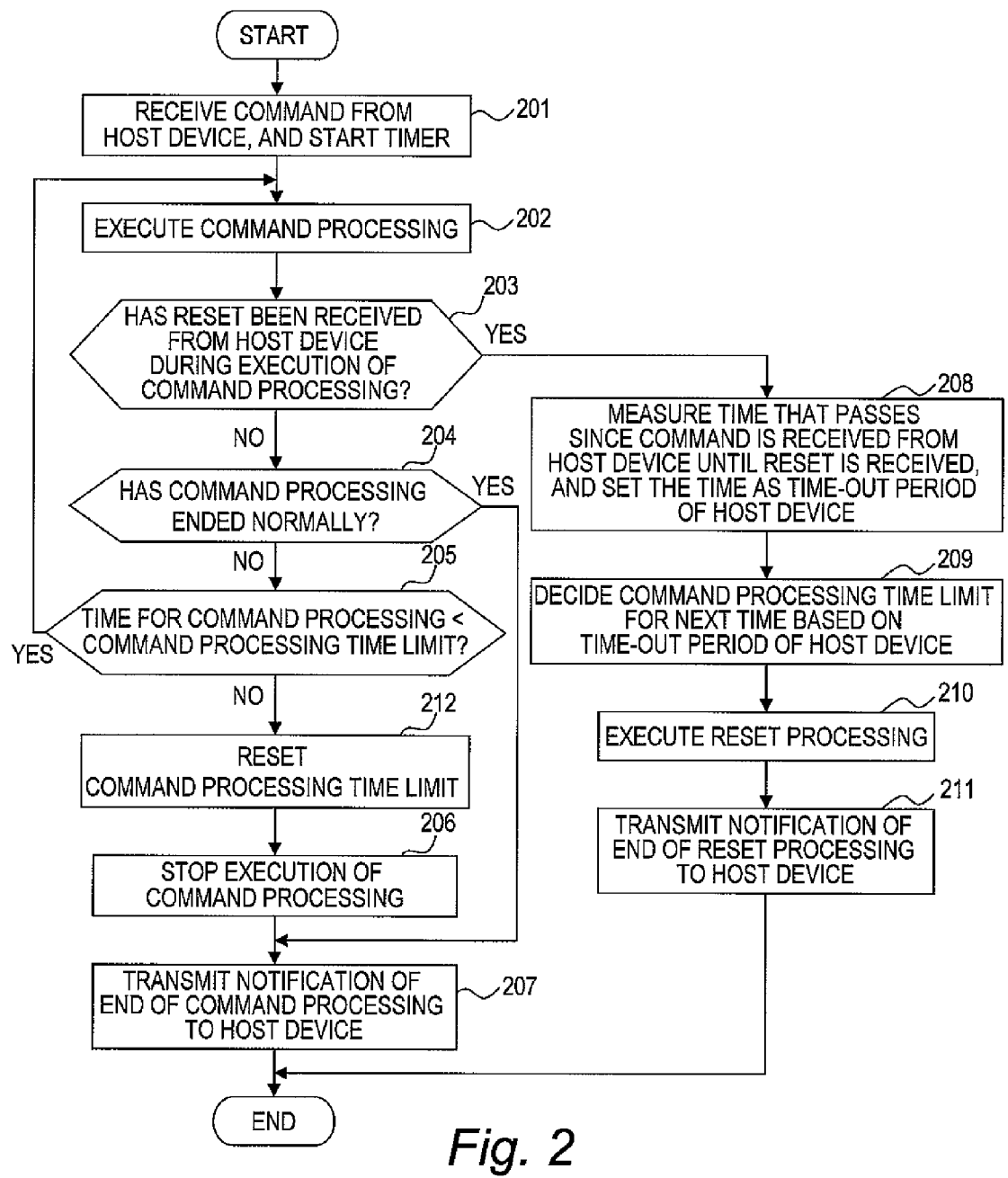
FIG. 2 is a flowchart illustrating a processing executed by the optical disc drive according to the embodiment of this invention.

FIG. 2 is a flowchart illustrating a processing performed on the optical disc drive 100 according to the embodiment of this invention. The processing is executed by the system controller 107 (microprocessor).

The optical disc drive 100 according to the embodiment of this invention measures the time-out period of the host computer 200 by measuring a time that passes since a processing command is received from the host computer 200 until a reset command is received from the host computer 200.

First, when the power of the optical disc drive 100 is turned on, the system controller 107 of the optical disc drive 100 initializes each kind of parameter of the optical disc drive 100. In the initialization processing, the command processing time limit is set to an initial value. A value of such a time (for example, 1 minute through infinity) sufficiently longer than a time for the host computer to judge that the processing of a command has timed out upon the occurrence of an error may be set as the initial value.

Subsequently, upon reception of the processing command from the host computer 200, the system controller 107 of the optical disc drive 100 starts a timer for measuring the time-out period of the host computer 200 (Step 201). Then, the system controller 107 executes a processing according to the received command (Step 202). For example, upon reception of a play command, the system controller 107 plays the data recorded on the optical disc 101.

During execution of the processing according to the processing command, the system controller 107 monitors the reset command from the host computer 200, and judges whether or not the reset command has been received (Step 203).

As a result, if the reset command is received, the system controller 107 measures an elapsed time that passes since the processing command is received from the host computer 200 until the reset command is received based on the timer started in Step 201 because the time-out is judged by the host computer 200. Then, the elapsed time that has been measured is estimated as the time-out period of the host computer 200 (Step 208).

Subsequently, the system controller 107 decides the command processing time limit based on the estimated time-out period of the host computer 200 (Step 209). The command processing time limit is set shorter than the estimated time-out period. This is because a notification of the end of a command processing can be reliably transmitted to the host computer 200 before the host computer 200 times out (transmits the reset command). Hence, the command processing time limit is set shorter than the estimated time-out period by an overhead time for an internal processing of the optical disc drive 100 (time necessary for the processing of Steps 205 through 207) and a time necessary for communications with the host computer 200. The command processing time limit decided here is used for command processings received from next time on.

Subsequently, the procedure advances to Step 210, in which a reset processing is executed according to the received reset command. A notification of the end of the reset processing is transmitted to the host computer 200 (Step 211), thereby ending the reset processing. The reset processing brings the optical disc drive 100 to an initial state.

As described above, the optical disc drive 100 measures the time-out period of the host computer 200, and decides the command processing time limit.

It should be noted that upon reception of the first processing command after the initialization when the power is turned on, by inhibiting (or delaying) execution of the processing corresponding to the received command, thereby causing the host computer 200 to judge the time-out, the processing of Steps 208 through 211 may be executed to set the command processing time limit.

Further, after the boot, the host computer 200 may transmit a dummy command to the optical disc drive 100 (such as a command to read data unnecessary for a program processing)

to cause the optical disc drive 100 to measure the time-out period and set the command processing time limit to an appropriate initial value.

Next, description is made of control of the command processing using the command processing time limit.

If it is judged in Step 203 that a reset command is not received from the host computer 200, it is judged whether or not the command processing has ended normally (Step 204). If the command processing ends normally, a notification of the completion of the command processing is transmitted to the host computer 200 (Step 207). Meanwhile, if it is judged in Step 204 that the command processing has not ended normally, in other words, that the command processing has ended abnormally or that the command processing has not ended yet, the procedure advances to Step 205.

In Step 205, it is judged based on the timer started in Step 201 whether or not the elapsed time that passes since the processing command is received from the host computer 200 has timed out. In other words, a comparison is performed between the time that has elapsed for the command processing and the command processing time limit decided in Step 209. Then, if the elapsed time has not reached the command processing time limit, the procedure returns to Step 202 to continue the command processing. It should be noted that if the command processing has not ended yet, the command processing being performed currently is continued, while if the command processing has ended once due to an error, the command processing is executed again.

Meanwhile, if the elapsed time of the command processing reaches the command processing time limit (or exceeds the command processing time limit), the procedure advances to Step 212.

In Step 212, if a predetermined condition is satisfied, the command processing time limit is reset. Specifically, a counter for counting the number of times of the command processing is provided, and if the counter reads a predetermined value (for example, 10 times), the command processing time limit is extended by a predetermined time (for example, 5 seconds). The extension of the command processing time limit increases the probability that Step 203 may result in YES to reset the command processing time limit. Therefore, even if there is a change of the host computer 200, or if there is a change of a program (application program or OS) accessing the optical disc drive 100, the command processing time limit is reset to an appropriate time.

It should be noted that the command processing time limit may be reset to a longer time not based on the number of the times of the command processing but based on a predetermined elapsed time that passes since the command processing time limit is set.

Further, the time-out period may change depending upon the kind of optical disc (medium) inserted to the optical disc drive 100 (depending upon the application program that uses the medium). Therefore, the command processing time limit may be reset to the longer time when the medium is inserted (when a disc tray is opened/closed).

After that, the execution of the command processing is stopped (Step 206), and the abnormal end of the command processing is transmitted to the host computer 200 (Step 207).

As described above, in the optical disc drive 100 according to this embodiment, the time that can be spent for the execution of the command processing can be maximized according to the time-out period of the host computer 200.

It should be noted that it may be judged from management information recorded on the inserted optical disc what is the kind of the inserted optical disc and/or what are contents recorded on the inserted optical disc (in other words, which of stream data and file data the data recorded on the optical disc is), and a different processing time limit may be set based on the judgment result. For example, in a case of a copy-protected optical disc, the command processing time limit may be set to a shorter time because the data recorded on the optical disc is more probably the stream data.

Figure 3:
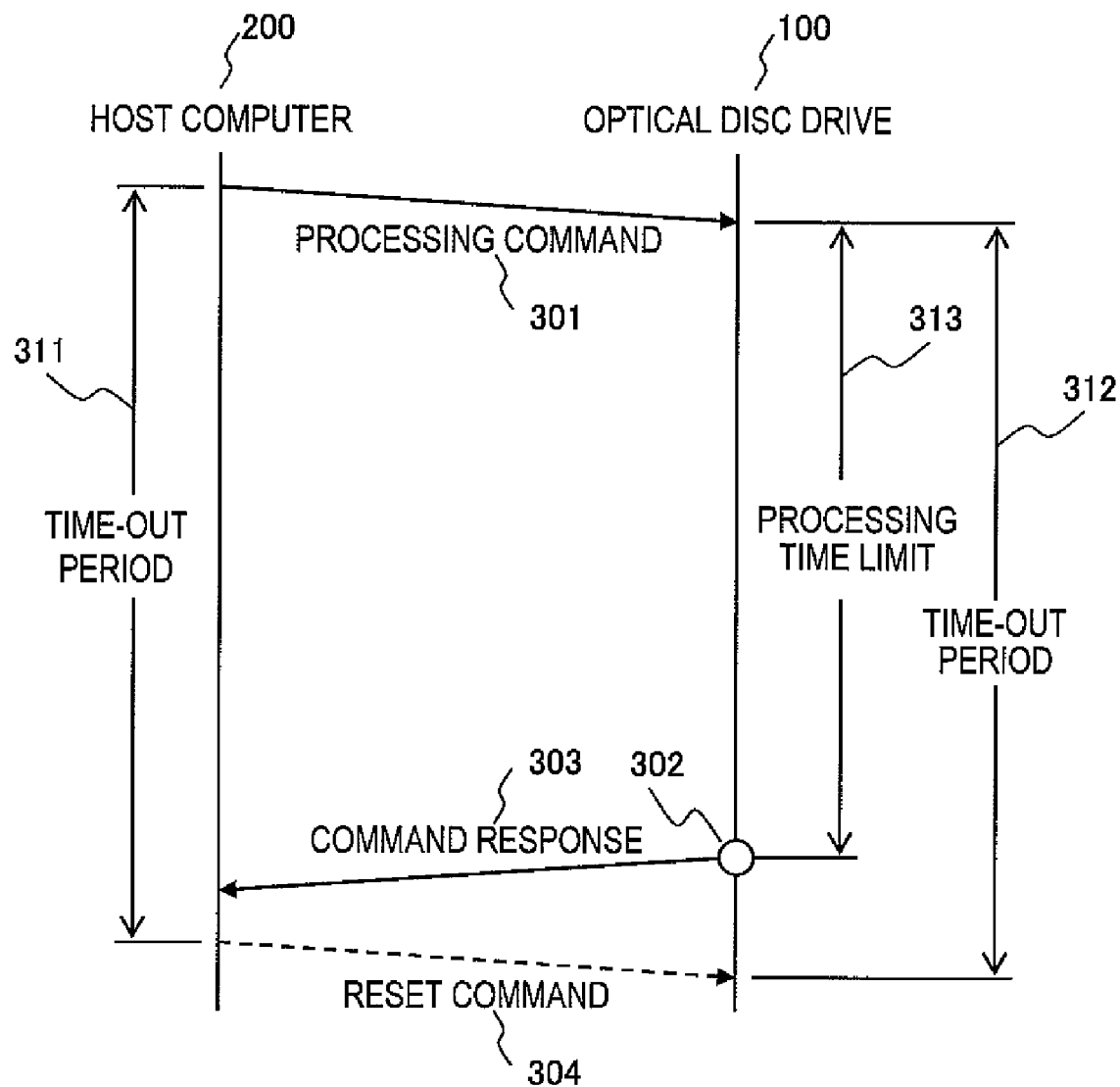
FIG. 3 is a sequential diagram between the optical disc drive and a host computer according to the embodiment of this invention.

FIG. 3 is a sequential diagram illustrating an exchange of a command between the optical disc drive 100 and the host computer 200 according to the embodiment of this invention.

The host computer 200 issues a processing command (for example, a read command and a write command) 301 to the optical disc drive 100. If there is no response from the optical disc drive 100 even after a predetermined time-out period 311 has elapsed since the transmission of the processing command 301, the host computer 200 judges the time-out, and issues a reset command 304. This is because, as described above, there is a possibility that the optical disc drive 100 may be out of order if the time-out is judged, the host computer 200 forcibly aborts the processing according to the previously-issued processing command, and issues another processing command for performing the same processing (or the subsequent processing).

Upon reception of the processing command 301 from the host computer 200, the optical disc drive 100 starts the timer for measuring a time-out period 312. Then, upon reception of the reset command 304 from the host computer 200, the optical disc drive 100 measures the time-out period 312 by the started timer. Then, a processing time limit 313 shorter than the time-out period 312 is set. The processing time limit 313 represents a time necessary to transmit a response 303 to a command if the processing time of the command exceeds the processing time limit 313 after the optical disc drive 100 judges whether or not a processing time of the command exceeds the processing time limit 313.

It should be noted that the initial value of the processing time limit 313 may be set to the value of a time (for example, 1 minute) longer than a time that passes since the host computer 200 transmits the processing command 301 until the host computer 200 transmits the reset command 304. In other words, the initial value may be set to the value of a time longer than the maximum time-out period by which the time-out is judged by the program on the host computer 200. By thus setting the initial value of the processing time limit 313, the time-out period can be measured upon the first time-out regardless of the program running on the host computer 200.

Upon reception of the processing command 301 from the host computer 200 after the processing time limit 313 is set, the optical disc drive 100 judges whether or not the processing of the received command 301 ends within the processing time limit 313 (302). If the processing of the command does not end within the processing time limit 313, the optical disc drive 100 transmits the response 303 indicating that the processing of the command has not been completed. Upon reception of the response 303 indicating that the processing of the command has not been completed, the host computer 200 issues another command for performing the same processing (or the subsequent processing) without transmitting the reset command 304.

Therefore, in the embodiment of this invention, the operation of the optical disc drive 100 is not initialized before the host computer 200 issues the reset command. This reduces the probability that the host computer 200 may judge that the optical disc drive 100 is out of order.

As described above, in the embodiment of this invention, based on the reset command 304 from the host computer 200, the host computer 200 measures the time-out period 312 of the host computer 200 (program running on the host computer 200), and sets the processing time limit 313 shorter than the measured time-out period 312. Then, if the processing of the received command 301 does not end within the processing time limit 313, the optical disc drive 100 transmits the response 303 indicating that the processing of the command has not been completed. Therefore, the optical disc drive 100 can dynamically set the command processing time limit. Accordingly, if the optical disc drive 100 is coupled to the host computer having an unknown time-out period, it is possible to set the appropriate time limit of the command processing.

Therefor; it is possible to secure the processing time of the appropriate command corresponding to the host computer 200 (program running on the host computer 200) and to increase an allowable time for the processing of the command. Accordingly, on the optical disc drive 100, it is possible to increase the probability that the command may be executed normally and to realize a stable operation that causes little error.

Further, the probability that the host computer 200 may judge the time-out is reduced, which can avoid issuing the reset command 304. In addition, by repeatedly issuing the reset command, the host computer 200 can avoid judging that the optical disc drive 100 is out of order and prevent the optical disc drive 100 from being decoupled.

Further, the processing time limit gradually increases, and hence the time-out period 312 of the host computer 200 is repeatedly measured. Even if there is a change of the host computer coupled to the optical disc drive 100, a new processing time limit can be set. In particular, even if there is a change of the OS running on the host computer (for example, if there is a change of the OS to be booted on the host computer of a dual-boot system), or even if there is a change in a host-side execution environment (for example, if there is a change of the application program running on the host computer), the appropriate processing time limit can be set.

While the present invention has been described in detail and pictorially in the accompanying drawings, the present invention is not limited to such detail but covers various obvious modifications and equivalent arrangements, which fall within the purview of the appended claims.

What is claimed is:

1. An optical disc drive for playing data from a loaded optical disc medium according to a processing command issued from a host device, comprising an optical head, a controller and an interface, the controller is configured to:

judge whether the processing command issued from the host device has been received and whether a reset command issued from the host device has been received, the reset command being transmitted in a case where the host device judges a time-out of a processing of the processing command;

measure a time between a reception of the processing command and a reception of the reset command in a case where the processing of the received processing command does not end until the reception of the reset command;

determine a processing time limit shorter than the measured time; and in a case where the processing of the received processing command does not end until the decided processing time limit has elapsed after the reception of the processing command, stop the processing of the processing command and notify that the processing of the processing command has been stopped to the host device.

2. The optical disc drive according to claim 1, wherein the notification of stopping of the processing of the processing command is a notification of abnormal ending of the processing of the processing command.

3. The optical disc drive according to claim 1, wherein the processing time limit is determined on a time longer than a current time in a case where a predetermined condition is satisfied.

4. The optical disc drive according to claim 3, wherein the processing time limit is determined on a time longer than a current time in a case where the processing of the processing command is executed a predetermined number of times.

5. The optical disc drive according to claim 1, wherein an initial value of the processing time limit is determined on a time longer than a time from a transmission of the processing command by the host device to transmission of the reset command by the host device.

6. The optical disc drive according to claim 1, further comprising a nonvolatile memory area for storing the determined processing time limit.

* * * * *